United States Patent [19]
Takahashi

[11] Patent Number: 6,088,396
[45] Date of Patent: Jul. 11, 2000

[54] METHOD AND APPARATUS FOR EDITING OR MIXING COMPRESSED PICTURES

[75] Inventor: Toshiya Takahashi, Takatsuki, Japan

[73] Assignee: Matsushita Electric Industrial Co., Ltd., Osaka, Japan

[21] Appl. No.: 09/128,667

[22] Filed: Aug. 4, 1998

Related U.S. Application Data

[62] Division of application No. 08/348,980, Nov. 28, 1994, Pat. No. 5,912,709.

[30] Foreign Application Priority Data

Dec. 1, 1993 [JP] Japan ................................ 5-301782
Mar. 10, 1994 [JP] Japan ................................ 6-039743

[51] Int. Cl.$^7$ ................................................. H04N 7/18
[52] U.S. Cl. .................... 375/240; 348/416; 348/415; 348/412; 348/413; 348/699; 348/700
[58] Field of Search ........................... 348/413, 415, 348/416, 411, 410, 699, 722, 14, 412; 395/501, 507; 375/240

[56] References Cited

U.S. PATENT DOCUMENTS

| | | | |
|---|---|---|---|
| 5,293,229 | 3/1994 | Iu | 348/415 |
| 5,367,341 | 11/1994 | Schnorf | 348/616 |
| 5,563,649 | 10/1996 | Gould et al. | 348/14 |
| 5,577,190 | 11/1996 | Peters | 395/501 |

*Primary Examiner*—Andy Rao
*Attorney, Agent, or Firm*—Wenderoth, Lind & Ponack, L.L.P.

[57] ABSTRACT

To facilitate editing of first and second compressed picture data each having been obtained by prediction-coding, the second compressed picture data is modified by decoding a frame of the second compressed picture data at an editing point and re-coding the decoded data such that every frame around the editing point can be decoded after editing. The first compressed picture data and the modified second compressed picture data are linked to complete the editing. To facilitate mixing of a compressed picture data with a non-compressed picture data, the compressed picture data is decoded and added to the non-compressed picture data to obtain a mixed picture data. The mixed picture data is re-coded to be a compressed picture data. In each of the editing and mixing, the re-coding may be performed by using at least one of the motion compensation information, motion vector information and orthogonal transform mode information which can be derived from the compressed picture data during the decoding process.

6 Claims, 10 Drawing Sheets

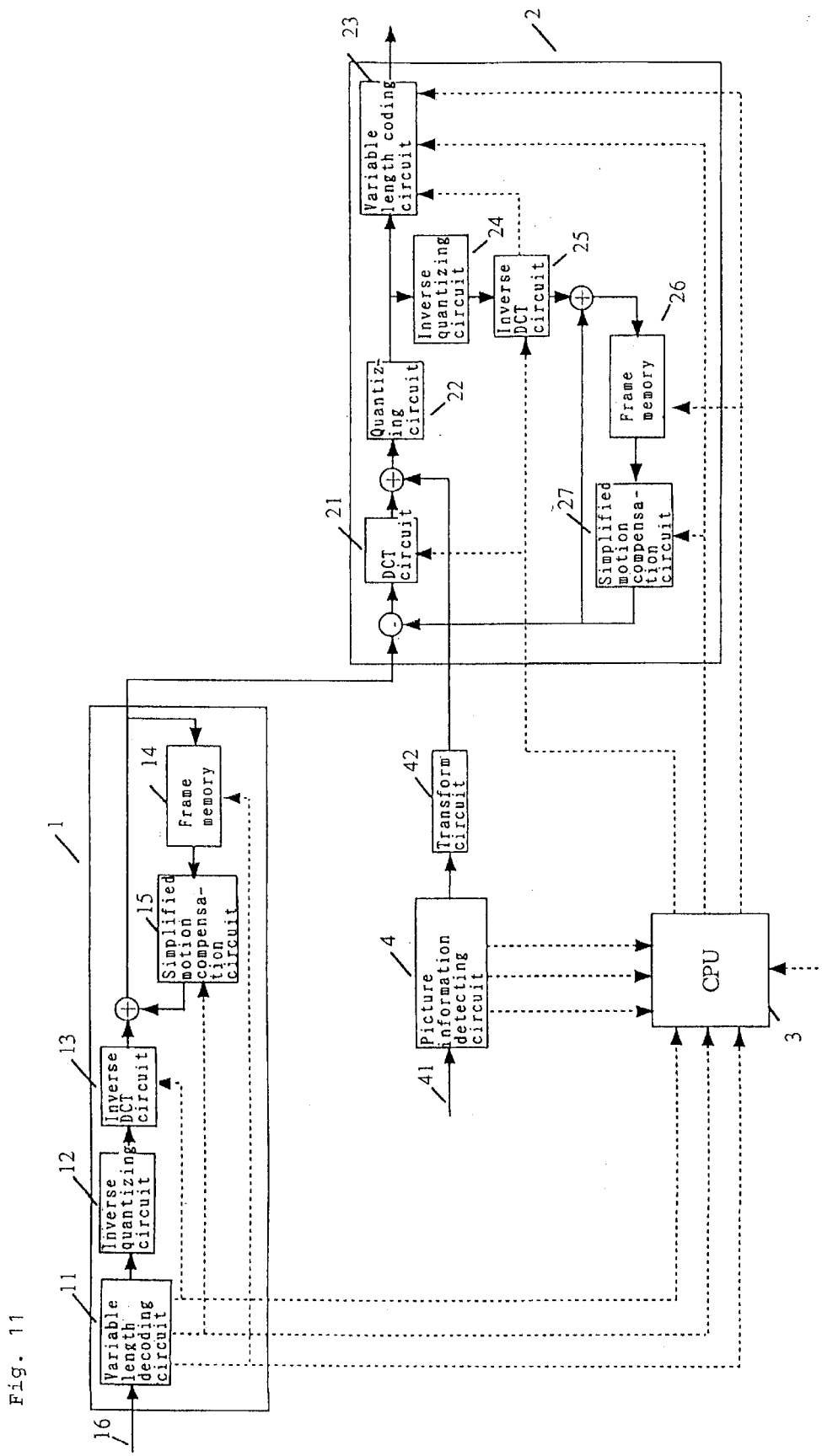

METHOD AND APPARATUS FOR EDITING OR MIXING COMPRESSED PICTURES

This is a Rule 1.53(b) Divisional of application Ser. No. 08/348,980, filed Nov. 28, 1994, now U.S. Pat. No. 5,912,709.

BACKGROUND OF THE INVENTION

1. Field of the Invention

The present invention relates to a compressed picture editing method for editing compressed picture data, and a picture coding apparatus for mixing a part or an entirety of compressed picture data with other compressed picture data or real time picture data.

2. Description of the Prior Art

A digital video signal possesses an enormous amount of information, and picture coding is indispensable for transmission and recording. Various picture coding techniques have been developed recently, and some of them are produced as encoders and decoders.

As an example, a conventional picture coding apparatus using the MPEG (moving picture coding experts group) method is described below while referring to accompanying drawings.

FIG. 15 is a block diagram of the conventional picture coding apparatus. The apparatus comprises a motion detector 81, a DCT (discrete cosine transform) mode Judging circuit 82, a DCT circuit 83, a quantizing circuit 84, a variable length coding circuit 85, an inverse quantizing circuit 86, an inverse DCT circuit 87, a frame memory 88, and a motion compensation circuit 89. FIG. 16 is an explanatory diagram of the motion compensation predicting method, and FIG. 17 is an explanatory diagram of the frame memory 88 and the motion compensation circuit 89.

Thus, in the conventional picture coding apparatus, described above a video signal is scanned by interlacing and is entered as being divided into frame units. A picture in a first frame to be coded, namely, frame t in FIG. 16 is processed by intraframe coding using the data within the frame. First, the DCT mode Judging circuit 82 detects the motion of the input picture data in each two-dimensional block of pixels by, for example, calculating inter-line differences, determines, from the detection result, whether to perform DCT in the frame unit or in the field unit, and outputs the determination result as DCT mode information. The DCT circuit 83 receives the DCT mode information, and performs the DCT in either the frame unit or the field unit to transform the picture data into transform coefficients. The transform coefficients are quantized in the quantizing circuit 84, and are variable-length coded in the variable length coding circuit 85 to obtain a coded bit stream which is sent out to a transmission line. The quantized transform coefficients are simultaneously fed into the inverse quantizing circuit 86 and the inverse DCT circuit 87 to be returned to real time data, and the data is stored in the frame memory 88.

Generally, pictures have a high degree of correlation, and DCT causes a concentration of energy on the transform coefficients corresponding to low frequency components. Therefore, by roughly quantizing the high frequency components which are visually less obvious and finely quantizing the low frequency components which are important components, the picture quality deterioration is kept to a minimum, and the data quantity can be decreased at the same time. In the interlace scanned picture, if the motion is small, the intraframe correlation is strong, and if the motion is large, the interframe correlation is small while the intrafield correlation is high. By making use of such characteristics of interlace scanning, i.e., by changing over the frame-based DCT and the field-based DCT, the interlaced picture can be coded efficiently.

On the other hand, in the pictures after frame t+1, predicted picture values are calculated for every frame, and differences of the predicted picture values from the original picture values, i.e., the predicted errors, are coded.

In MPEG, the calculating method of the predicted picture value includes forward prediction, backward prediction, and bidirectional prediction. FIG. 16 is an explanatory diagram of the prediction methods. The frame at time t is intraframe coded (hereinafter, an intraframe coded frame is called I frame). Then, a difference of the frame at time t+3 from a frame obtained by decoding the I frame is calculated after motion compensation, is calculated and this difference is coded. This operation for predicting a frame which is ahead in time is called forward prediction (hereinafter, a frame coded by forward prediction is called P frame). Frames at time t+1, t+2 are similarly subjected to motion compensation, and difference calculation and difference coding is performed by using frames decoded from the I and P frames. At this time, the predicted picture is composed by selecting in a block having a minimum error from the blocks of I frame (forward prediction), P frame (backward prediction), and the mean of I frame and P frame (bidirectional prediction) (hereinafter, a frame coded at a part thereof or in its entirety by bidirectional prediction is called B frame). The B frame is predicted from frames before and after it in time, so that a newly appearing object can be predicted accurately, thereby enhancing the coding efficiency.

As the encoder, in the first place, the motion vector to be used in prediction is detected by the motion detector 81 on a two-dimensional block by block basis by, for example, the well-known full search method. Next, using the detected motion vector, the frame memory 88 and the motion compensation circuit 89 generates a next predicted value which has been compensated for the motion in each two-dimensional block.

FIG. 17 is an example of the motion compensation circuit 89. Herein the generation of predicted is explained value of bidirectional prediction. The motion vector calculated in the motion detector 81 is fed into an address circuit 882 in the frame memory 88, and pictures of I and P frames stored in the frame memory 881 are read out. At this time, to correspond to the interlaced picture same as in DCT, the two-dimensional blocks are formed in each frame or each field, and the vectors and predicted picture values are generated respectively. In each two-dimensional block, six kinds of errors in total are calculated in square error calculating circuits 893 to 898. The errors calculated by using frame vectors are a forward prediction error, a bidirectional prediction error and a backward prediction error, and the errors calculated by using field vectors are a forward prediction error, a bidirectional prediction error and a backward prediction error. A smallest one of the six errors is selected by an error comparator 899, and the predicted values and prediction mode information are issued. The above prediction mode information, motion vector, and DCT mode information are variable-length coded in the variable length coding circuit 85, and are sent out to the transmission line together with the DCT transform coefficients.

Thus, according to such a picture coding apparatus, since the predicted error is optimally coded, the energy is decreased and coding of higher efficiency is realized as compared with the case of direct coding of picture data such as intraframe coding. (Refer, for example, ISO/IEC JTC1/SC29/WG11 N0502, "Generic Coding of Moving Pictures and Associated Audio," July 1993.)

However, when editing the compressed picture data coded by using such a picture coding method, various problems occur as a result of the differences of picture data which are coded. FIG. 18 is an explanatory diagram showing a conventional editing method for compressed picture data. Referring now to FIG. 18, the problems are explained below. In FIG. 18, suppose it is desired to link compressed picture data of (a) and (b) at the dotted line portions. Numerals given in FIG. 18 represent frame numbers. Since the B frame is coded after the I and P frames have been coded, the sequence of the coded frames is changed from the sequence to be displayed. After linking the compressed picture data of (a) and (b), the P and B frames right after the editing point, that is, the P frame of frame number 8 and the B frames of frame numbers 6 and 7 in the compressed picture data (b) cannot be decoded because the I frame of frame number 5 used in prediction is lost. Also, the pictures appearing after frame 9 used in prediction of the P frame of frame number 11 cannot be decoded.

Moreover, various problems occur when the compressed picture data coded by the picture coding method is mixed with other picture data. The conventional picture mixing of analog signals is realized by adding elements together, but the compressed picture data are coded in variable length, and cannot be added simply on a bit by bit basis. Besides, in order to perform mixing by decoding the compressed picture to restore real time picture data, adding the decoded picture to other pictures and coding the added result again, the mixing apparatus must be provided with both a decoder and an encoder, which results in a large size.

SUMMARY OF THE INVENTION

It is a primary object of this invention to present editing and mixing methods of compressed pictures, and editing and mixing apparatuses of compressed pictures, which are capable of editing and mixing compressed pictures which are compression-coded by the interframe difference coding method in a simple constitution.

To achieve this objective, the present invention presents a compressed picture editing method comprising the steps of: receiving first and second compressed picture data each having been obtained employing prediction-coding by at least one type of prediction out of a forward prediction for predicting a picture data in a current frame from a previous frame ahead in time, a backward prediction for predicting from a subsequent frame behind in time, and a bidirectional prediction simultaneously using both the forward prediction and the backward prediction; decoding a frame of the second compressed picture data; intraframe coding a frame of the decoded picture corresponding to a editing point; prediction-coding again a part or whole of the other frames of the decoded picture by using motion compensation, motion vector, and orthogonal transform mode information obtained by decoding the second compressed picture data to obtain modified second compressed picture data; and linking the first compressed picture data with the modified second compressed picture data.

In this constitution, the compressed picture data is once decoded, and the frame right after the editing point is coded again into an I frame, so that the predicted picture will not be lost by editing. For coding P and B frames, the motion compensation, motion vector and DCT mode information obtained by decoding are used, so that a motion detector and a DCT mode Judging circuit required for mass calculation in the conventional picture encoder are not necessary, and the motion compensation circuit is simplified. Accordingly, the compressed picture data can be edited in a simple constitution.

In a compressed picture mixing method of the invention, a first compressed picture data is decoded, the decoded picture data and a second picture data are added to create a mixed picture data, and the mixed picture data is prediction-coded again by using motion compensation information, motion vector, and orthogonal transform mode information obtained by decoding the first compressed picture data.

In another method, a first compressed picture data and a second compressed picture data having been compression-coded in the same manner as in the first compressed picture data are decoded, orthogonal transform coefficients of the first compressed picture data and the second compressed picture data are added to create a mixed picture data, and the mixed picture data is prediction-coded again by using motion compensation information, motion vector, and orthogonal transform mode information obtained by decoding the first compressed picture data.

According to this constitution, since the real time picture data or orthogonal transform coefficients are added after decoding the compressed picture data, even compressed picture data coded by variable length coding can be mixed. In addition, when coding the mixed picture again, since the motion compensation, motion vector, and orthogonal transform mode information obtained by decoding are used, a motion detector and an orthogonal transform mode Judging circuit required for mass calculation in the conventional picture encoder are not necessary, and the motion compensation circuit is simplified. Accordingly, the compressed picture data can be mixed in a simple constitution. Furthermore, the picture data to be mixed may be multiplexed on the compressed picture data in transmission, so that a picture mixing apparatus light in the load at the coding side can be realized.

BRIEF DESCRIPTION OF THE DRAWINGS

FIG. 4 is an explanatory diagram showing an editing method of compressed picture data in the first embodiment of the invention.

FIG. 5 is an explanatory diagram showing an editing method of compressed picture data in a second embodiment of the invention.

FIG. 6 is an explanatory diagram showing an editing method of compressed picture data in a third embodiment of the invention.

FIG. 7 is an explanatory diagram showing an editing method of compressed picture data in the third embodiment of the invention.

FIG. 11 is a block diagram of a picture mixing apparatus in a fifth embodiment of the invention.

FIG. 18 is an explanatory diagram showing a conventional editing method of compressed picture data.

DESCRIPTION OF THE PREFERRED EMBODIMENTS

Figure 1:
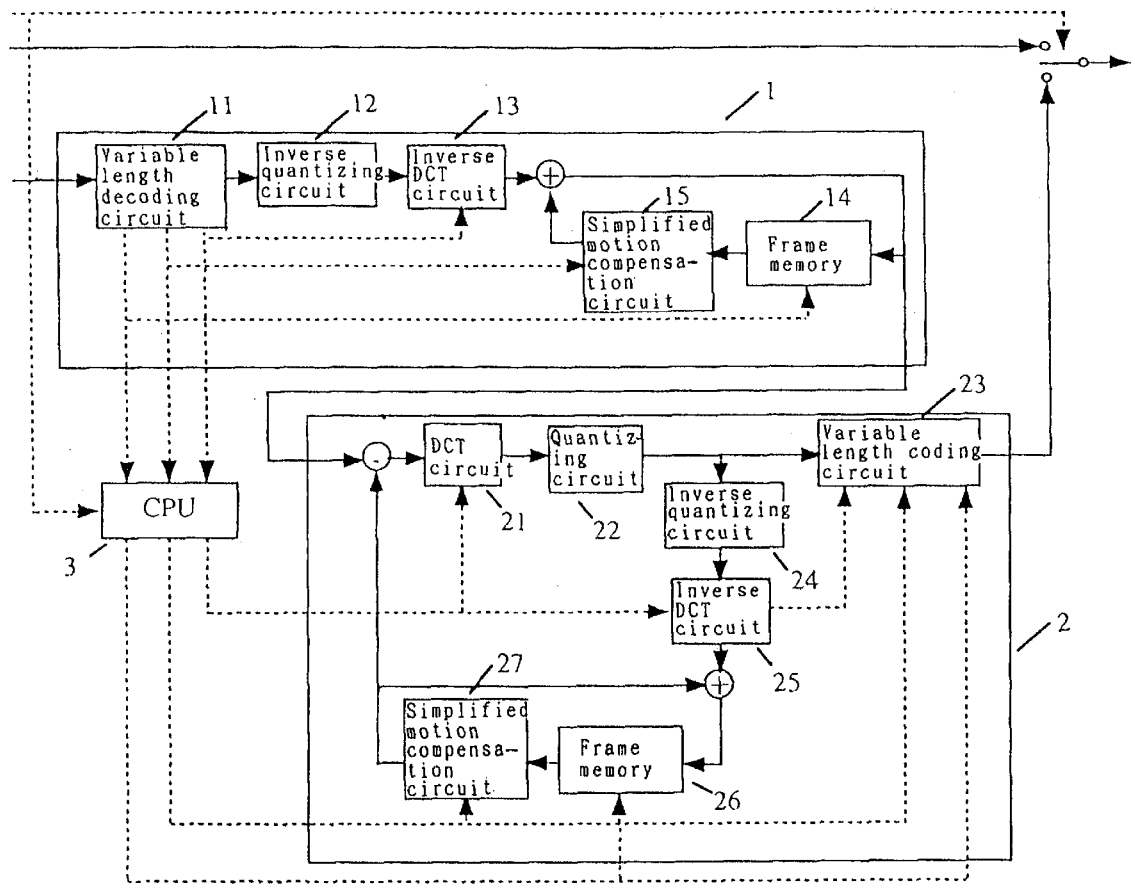
FIG. 1 is a block diagram of a compressed picture encoder in a first embodiment of the invention.

A compressed picture editing method according to a first embodiment of the invention is described below while referring to the drawings.

Figure 2:
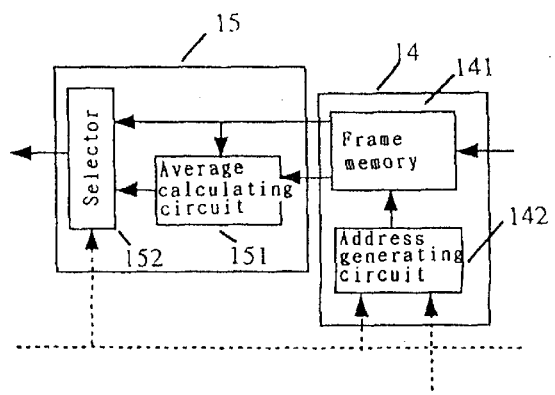
FIG. 2 is a block diagram of a simplified motion compensation circuit and a frame memory in the first embodiment of the invention.
Figure 3:
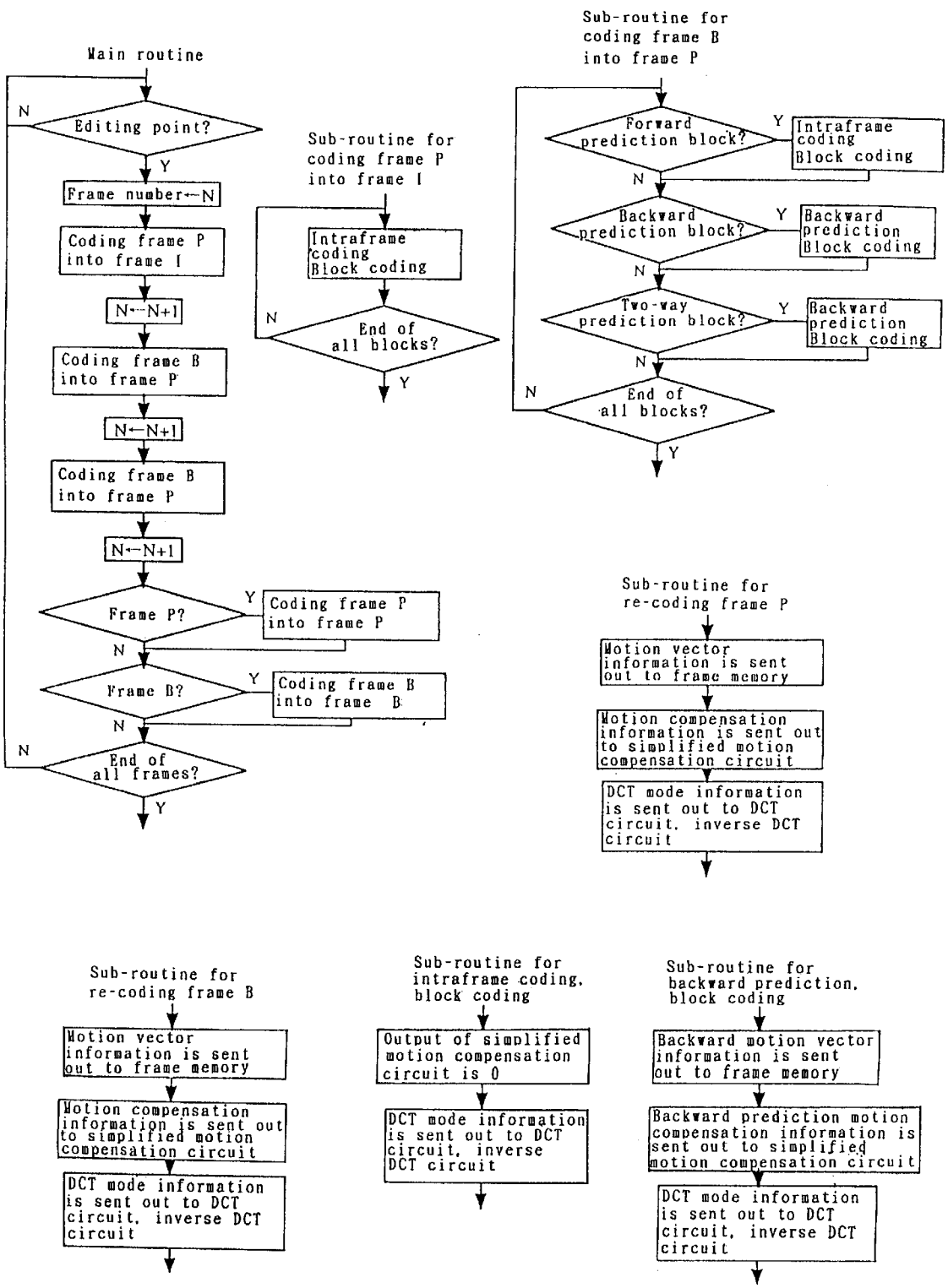
FIG. 3 is a flow chart showing an example of the operation of the CPU in the first embodiment of the invention.

FIG. 1 is a block diagram of a picture encoder in the first embodiment of the invention. In FIG. 1, reference numeral 1 denotes a picture decoding unit which comprises a variable length decoding circuit 11, an inverse quantizing circuit 12, an inverse DCT circuit 13, a frame memory 14, and a simplified motion compensation circuit 15. Reference numeral 2 is a picture encoding unit which comprises a DCT circuit 21, a quantizing circuit 22, a variable length coding circuit 23, an inverse quantizing circuit 24, an inverse DCT circuit 25, a frame memory 26, and a simplified motion compensation circuit 27. Reference numeral 3 is a control unit which comprises a CPU. FIG. 2 is a detailed structural diagram of the simplified motion compensation circuit 15 and frame memory 14. FIG. 3 is an explanatory diagram of algorithm showing an example of operation of the CPU 3, and FIG. 4 is an explanatory diagram showing an editing method of compressed picture data. The frame accompanied by an apostrophe (') denotes a re-coded frame. It is the same in FIG. 5 through FIG. 7.

The above constituted picture encoder is described while referring to FIGS. 1 through 4.

Suppose it is desired link compressed picture data (a) and (b) as shown in FIG. 4. For the sake of simplicity, the editing point is supposed to be a P frame. When the compressed picture data (a) in FIG. 4 enters the picture encoder in FIG. 1, it is output as it is until coming to the editing point indicated by the dotted line in FIG. 4. On the other hand, the compressed picture data (b) in FIG. 4 is put in the picture decoding unit 1, but the output of the picture coding unit 2 is not sent as an output up to the editing point. The compressed picture data (b) is decoded in the picture decoding unit 1. That is, depending on the DCT mode information that is decoded in variable length in the variable length decoding circuit 11, inversely quantized in the inverse quantizing circuit 12, and decoded in the inverse DCT circuit 13, inverse DCT is performed on a frame by frame or field by field basis to return to real time picture data. Yet, because of the different coding, using the decoded motion vector and motion compensation mode information, a predicted picture is generated in the frame memory 14 and simplified motion compensation circuit 15, and is summed with the inverse DCT circuit output data, thereby creating decoded picture data. FIG. 2 is an example of the frame memory 14 and simplified motion compensation circuit 15. As compared with the conventional picture encoder, the constitution of the frame memory 14 is the same, but the motion compensation circuit 15 is substantially different. Since the motion compensation mode has been already determined by the encoder, any square error calculation circuit is not needed in the picture decoding unit, and hence it only requires, as shown in FIG. 2, a mean or average calculating circuit 151 which is necessary when the bidirectional prediction is selected, and a selector 152 for issuing a predicted picture depending on the motion compensation mode information.

Figure 14:
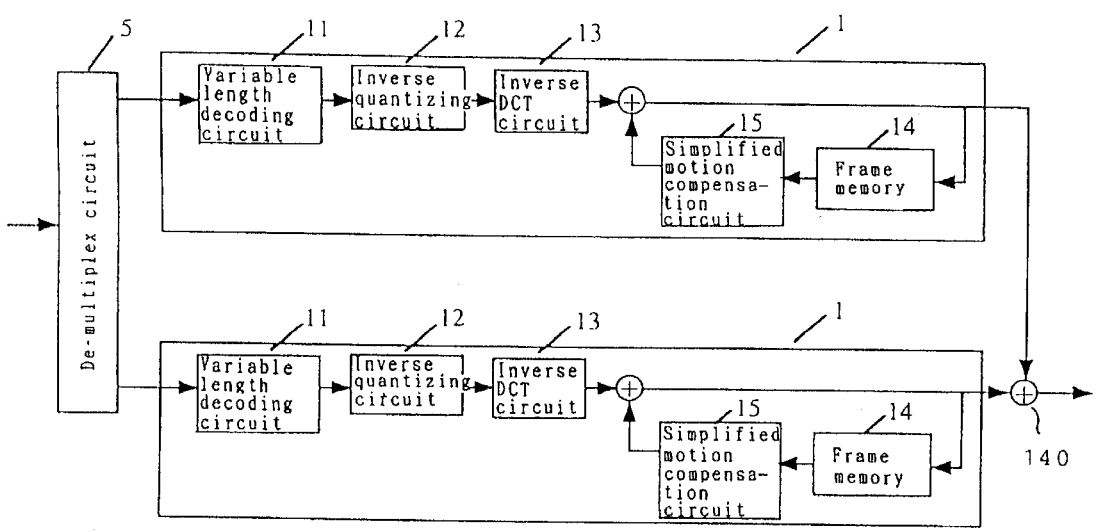
FIG. 14 is a block diagram of the picture mixing apparatus in the sixth embodiment of the invention.
Figure 15:
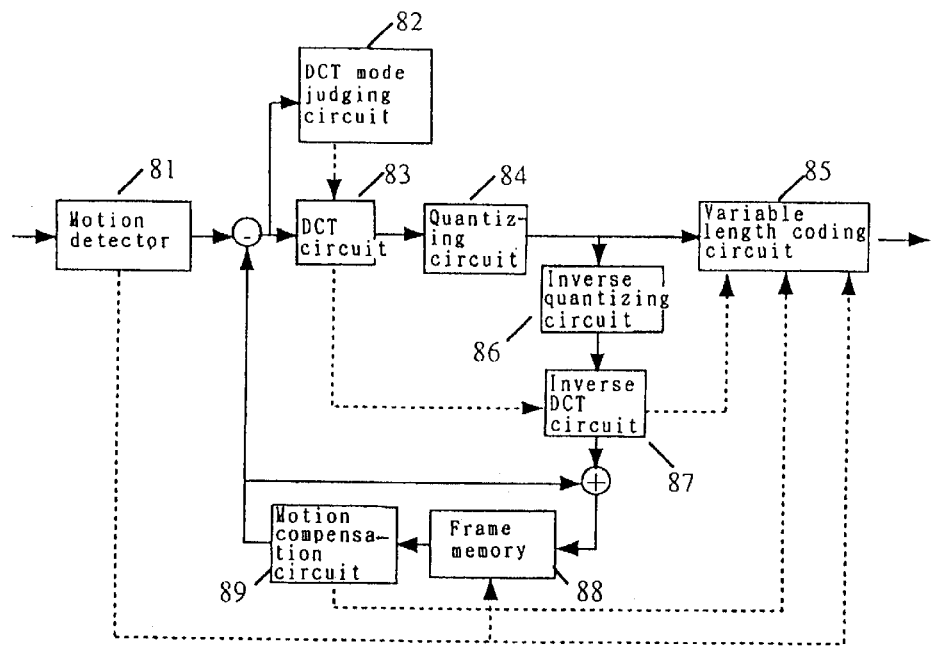
FIG. 15 is a block diagram of a conventional picture encoder.

When a signal showing an editing point is entered, as shown in (c), the P frame right after the editing point, among the compressed picture data (b), is re-coded as an I frame, and is linked to the compressed picture data (a) and issued. In the compressed picture data (b), the B frames of frame numbers 6, 7 are coded again by backward prediction because the I frame of frame number 5 which is necessary for forward prediction has been lost by editing. As for the P frame after frame number 8 in the compressed picture data (b), since the picture used in prediction has been coded again, the predicted picture is set again to a correct one, and the P frame is coded again into a new P frame, and the B frame B into a new B frame. The re-coding method is nearly the same as in the prior art, except that the motion compensation mode information, motion vector, and DCT changeover information are obtained by decoding the compressed picture data (b). Therefore, the picture coding unit 2 does not require a motion detection circuit and a DCT mode Judging circuit for mass calculation as used in the conventional picture encoder as shown in FIG. 14, and the motion compensation circuit 89 can be replaced by the simplified motion compensation circuit 27 which is the same as the one that exists in the decoding apparatus. All of the control is effected by the CPU 3, and its algorithm is shown in FIG. 3.

FIG. 3 shows a flow chart of the main routine showing the entire operation, sub-routine for coding the P frame into and I frame right after the editing point used in the main routine, sub-routine for coding the B frame into a P frame by using backward prediction only, sub-routine for recoding the P frame and B frame, and intraframe coded block coding sub-routine and backward prediction block coding subroutine for coding by changing the motion compensation mode of the block for each frame being used in the foregoing subroutines.

In a general decoder, a reception buffer of a specific capacity is provided, and deviations of transmission rate and decoding speed of the decoder is absorbed. In the encoder, compression and coding are controlled so that the reception buffer of the decoder may cause neither overflow nor underflow. Similar operation is needed when editing compressed picture data. In this embodiment, for example, the CPU 3 sequentially calculates the buffer content in the reception buffer, and the quantizing width of the quantizing circuit 22 is controlled such that the compressed picture data, after editing, may cause neither overflow nor underflow of the reception buffer. Besides, as a simpler method for preventing overflow at the editing point, it is also possible to add dummy data other than picture data (all zero, etc.) to the picture data.

Thus, according to the embodiment, since the compressed image data to be edited is re-coded in the picture encoder of a simple constitution, even the compressed picture data, using interframe difference coding, can be edited without losing the compressed picture data after splicing.

FIG. 5 is an explanatory diagram of an editing method of picture compressed data in a second embodiment of the invention. The compressed picture data of (b) in FIG. 5 contains an I frame after the editing point. From the editing point to the point before the frame number 11, the frames are re-coded in the same manner as in the first embodiment. Since the I frame of frame number 11 has been coded within the frame, it is not affected by editing. Therefore, the I frame is not re-coded. As for the B frames of frame numbers 9 and 10, since the P frame of frame number 8 is coded newly into an I frame, the B frames 9, and 10 are recoded by using the newly coded I frame. As for the frames appearing after frame number 14, since the I frame of frame number 11 is not re-coded, there is no effect on the frames and it is not necessary to re-code, them and the compressed picture data is issued as it is. The operation described thus far can be realized by varying the program of the CPU 3 in the first embodiment.

According to the embodiment, thus, the number of frames to be re-coded may be decreased, and picture quality deterioration due to re-coding may be kept to a minimum.

In the second embodiment, frames after frame number 14 are not re-coded because the I frame of frame number 11 is not re-coded. However, as mentioned in the first embodiment, when control of reception buffer is necessary, not only must the B frame be re-coded right after the I frame, but also all P and B frames as shown in (d) of FIG. 5.

According to this technique, by keeping the frames to be re-coded, as few as possible compressed picture data free from problems of overflow or underflow of reception buffer, after editing, may be obtained.

FIG. 6 and FIG. 7 are explanatory diagrams of editing method of compressed picture data in a third embodiment of the invention. In this embodiment, the editing point in (b) of FIG. 6 of the compressed picture data to be connected is in a B frame. When the B frame is selected as editing point the editing point and the B frame continuous to the editing point cannot be decoded because the I or P frame used in prediction is lost at the time of coding in the first and second embodiments. In this embodiment, as shown in (c) of FIG. 6 or (c) of FIG. 7, an I or P frame just before the editing point used in prediction is inserted by the number of undecodable B frames. When the frame just before the editing point used in prediction is an I frame, as shown in (c) of FIG. 6, this I frame just before the editing point is inserted as it is, basically. In the case of a P frame, it is re-coded into an I frame as shown in (c) of FIG. 7. If the reception buffer experiences an overflow or an underflow, same as in the second embodiment, even in the case of the I frame, it is possible to re-code in order to control the quantizing width so as prevent overflow or underflow.

Thus, according to the embodiment, if the editing point of the compressed picture data to be connected is a B frame, the picture quality deterioration due to re-coding may be kept to a minimum, while editing is enabled.

In the foregoing embodiments, there are two B frames, shown however the embodiment may be applied to one or three or more B frames.

In the embodiments described above, for the sake of simplicity, the intraframe coding block in the motion compensation mode of each block is omitted in the explanation, but generally intra-frame coding block modes can be selected on a two-dimensional block by block basis in the frame. When changing a B frame into a P frame composed only of backward prediction, the motion compensation mode of forward prediction block or the like can be re-coded in the same motion compensation mode as the motion vector is not contained in the compressed picture data. In such a case, it can be re-coded by selecting an intraframe coding block.

A compressed picture mixing method and a compressed picture mixing apparatus in a fourth embodiment of the invention are described below while referring to the accompanying drawings.

Figure 8:
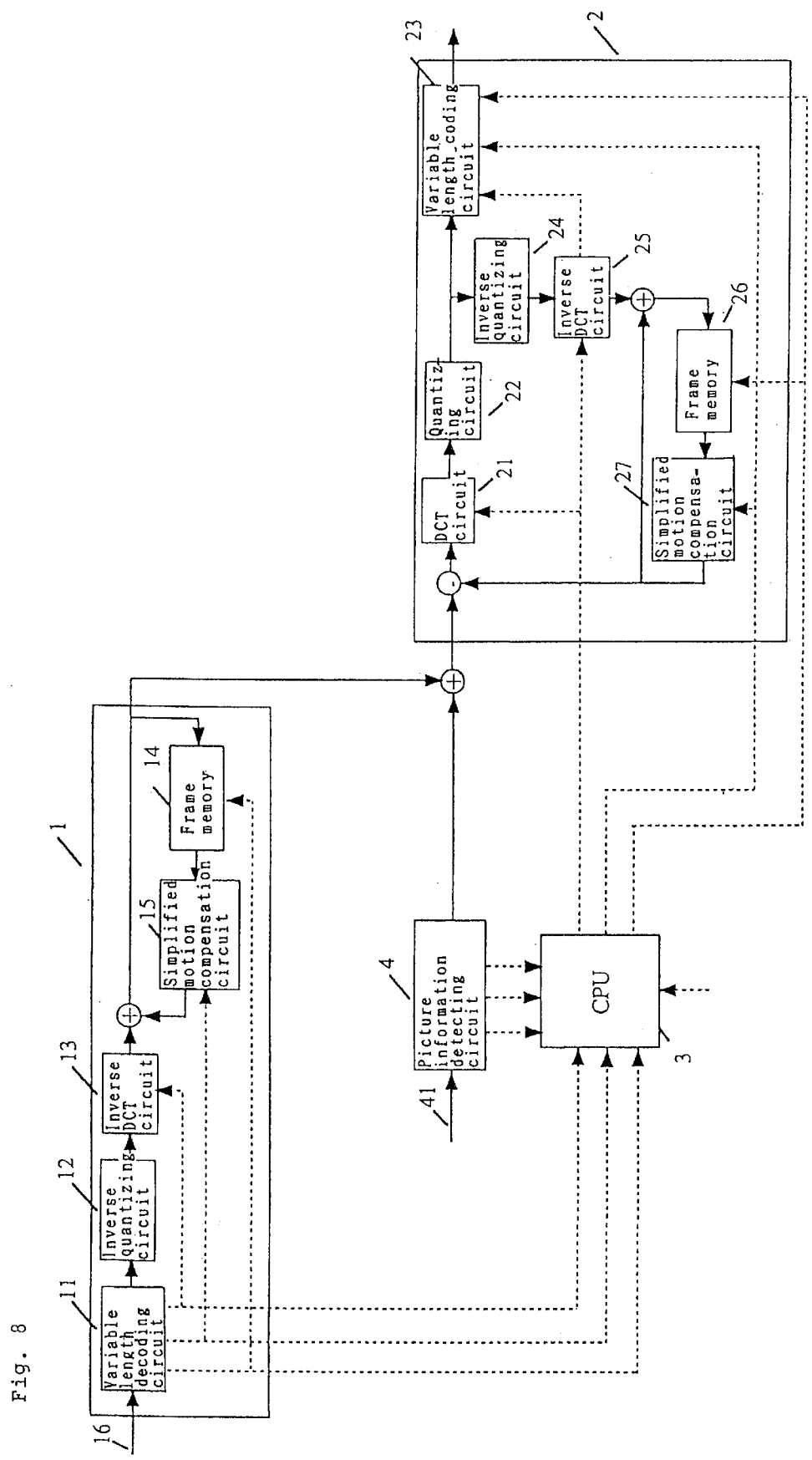
FIG. 8 is a block diagram of a picture mixing apparatus in a fourth embodiment of the invention.
Figure 9:
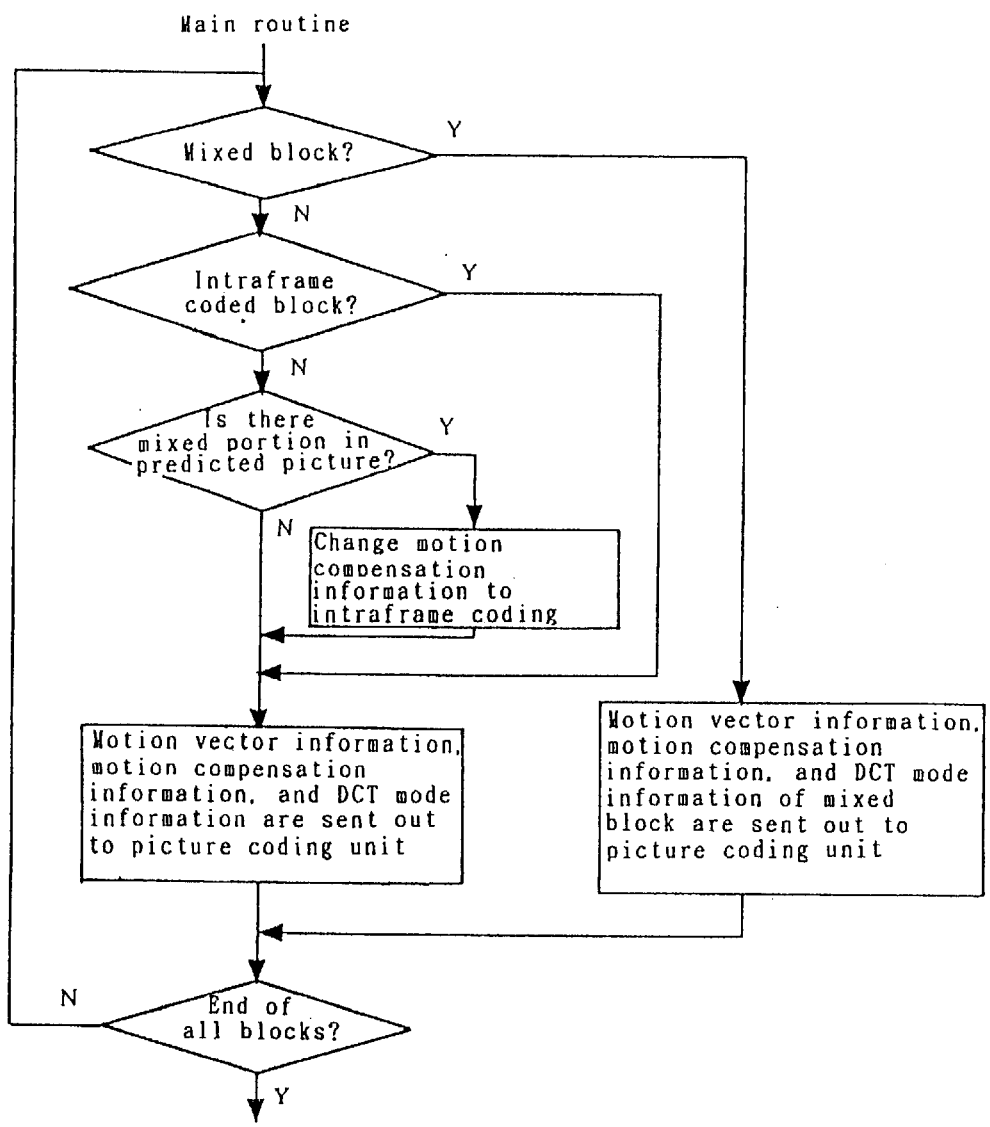
FIG. 9 is a flow chart showing an example of the operation of the CPU in the fourth embodiment of the invention.
Figure 10:
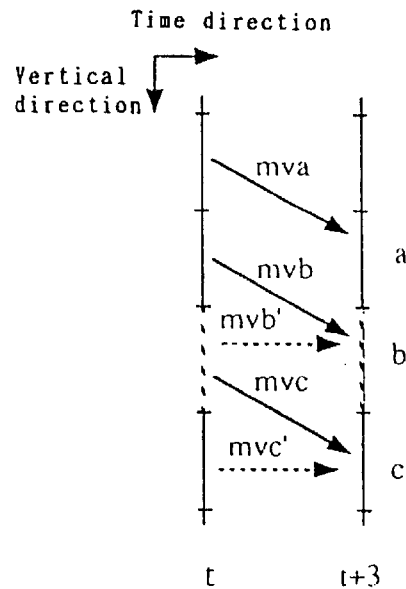
FIG. 10 is an explanatory diagram showing a motion compensation method of a mixed picture in the fourth embodiment of the invention.

FIG. 8 is a block diagram of a picture mixing apparatus in the fourth embodiment of the invention. In FIG. 8, reference numeral 1 denotes a picture decoding unit, and 2 is a picture coding unit, and they operate in the same manner as in the first embodiment. FIG. 9 is an explanatory diagram of algorithm showing an example of an operation of CPU 3, and FIG. 10 is an explanatory diagram showing the motion compensation method of a mixed picture.

Thus above constituted picture encoder is described below with reference to FIG. 8 through FIG. 10.

Suppose it is desired to mix picture data with a compressed picture data that has been prediction-coded. The compressed picture data in FIG. 8 is entered from an input terminal 16, while a certain picture data is fed from an input terminal 41. The compressed picture data is decoded in the picture decoding unit 1 in the same manner as in the first embodiment.

On the other hand, picture information from the picture data to be mixed is detected in a picture information from the picture data to be mixed detector 4. The picture data to be mixed may be either an uncompressed picture data or another compressed picture data. The picture information detector 4 is a circuit for detecting the picture information to be used in coding a mixed picture. It may be omitted if it is not necessary to enhance the coding efficiency. The picture information to be detected may include, in the case of uncompressed picture data, motion information showing how may pixels in the picture are changing between frames. In the compressed picture data, the picture information detector may be composed in the same manner as in the picture decoding circuit 1, and the information to be detected may include motion vectors, motion compensation information, and orthogonal transform mode information.

Mixing is achieved by adding the picture data decoded by the picture decoding unit 1 and the picture data outputted from the picture information detector 4. In principle, mixing can be started from any frame, but it is desirable to start from an intraframe coded frame (I frame). The reason is that, if started from a predicted frame, a completely new picture appears as if the scene were changed, which cannot be predicted from the preceding frame, thereby lowering the coding efficiency. Furthermore, depending on the picture to be mixed, the content is not changed frequently such as in the case of superimposed dialogue. In such a case, by changing the content at intervals of the intraframe coding frames, the interframe difference can be decreased, such that the coding efficiency can be enhanced.

The mixed picture data after addition is re-coded in the picture coding unit 2 into compressed picture data. FIG. 10 shows the motion compensation method of the blocks in each frame. The solid line in FIG. 10 denotes decoded picture data, and picture data of broken line, or block b, is the added mixed picture data. Frame t+3 uses frame t as a prediction picture. The decoded motion vectors of the respective blocks are indicated by arrows mva, mvb, and mvc in the diagram.

Figure 16:
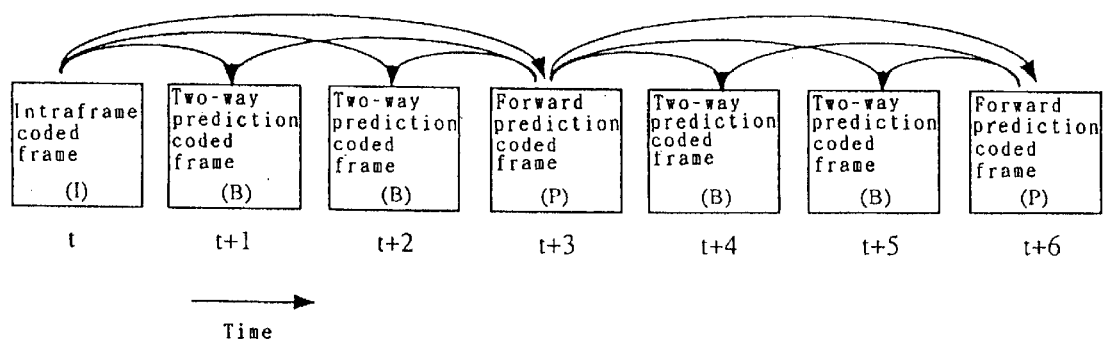
FIG. 16 is an explanatory diagram of a conventional motion compensation prediction method.
Figures 17, 18A, 18B, 18C:
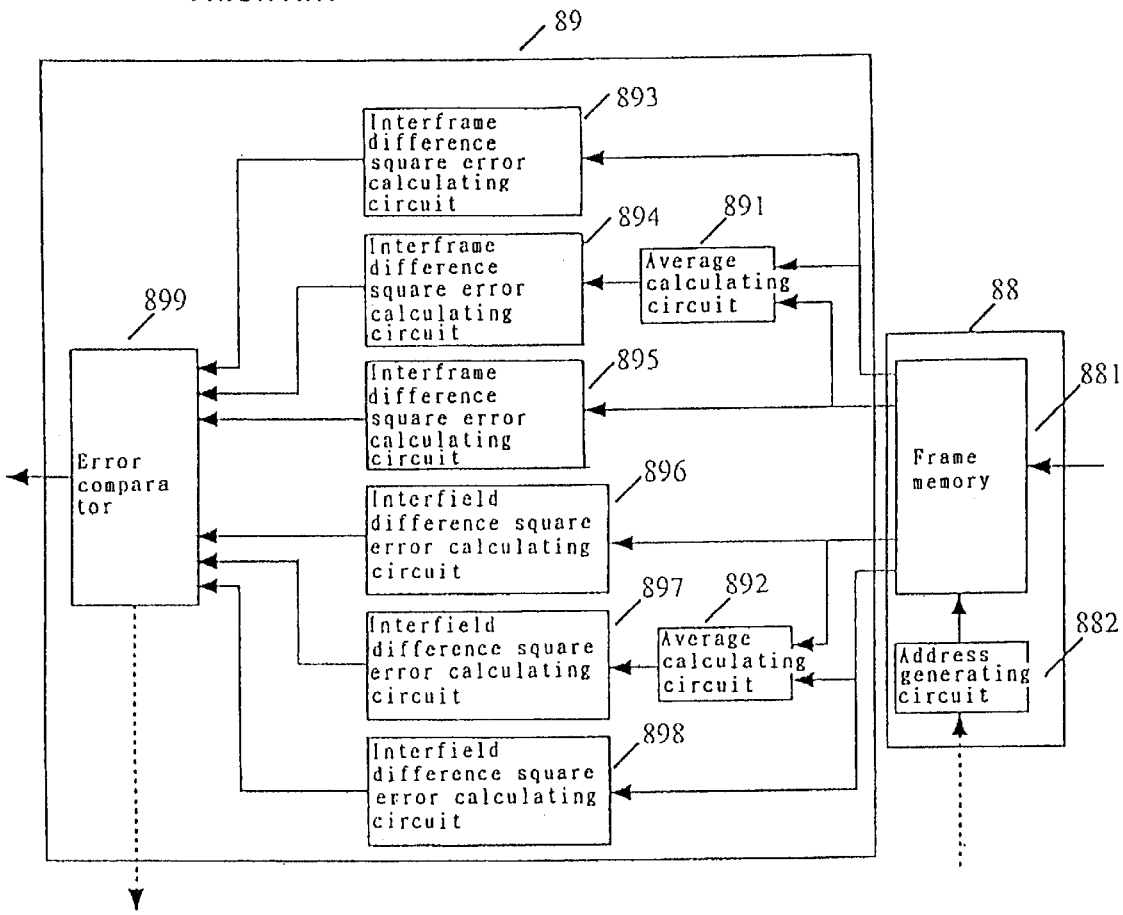
FIG. 17 is a constitution diagram of a conventional motion compensation circuit and a frame memory.

In block a, the decoded picture data is used as a prediction picture. The re-coding method of block a is nearly the same as the coding method in the prior art, but the motion compensation mode information, motion vector, and DCT change-over information are information obtained by decoding the compressed picture data. Therefore, in the picture coding unit 2, a motion detector and a DCT mode Judging circuit requiring massive calculation are eliminated, thus this is unlike the image encoder of the prior art shown in FIG. 16. Furthermore the motion compensation circuit 89 may be replaced with a simplified motion compensation circuit 27 which is the same as the one that exists in the decoding apparatus.

Block b is replaced with mixed picture data in frame t+3. Therefore, the content is completely different from the predicted image generated in the motion vector mvb. Therefore, by intraframe coding the block b, or replacing mvb with mvb', the motion compensation information and motion vector are changed so as to predict from the mixed block. Herein, mvb' is the motion information of the picture data to be mixed as being detected in the picture information detector 4.

Block c is predicted by motion vector mvc, but the predicted picture of frame t is replaced by mixing, and therefore the predicted picture is completely different. In Thus, by replacing the intraframe coding block or mvc with mvc', in block c the motion compensation and the motion vector are changed so as to predict from the decoded picture data.

It is the CPU 3 that is responsible for these controls, and FIG. 9 shows an algorithm of an example of the operation of the CPU 3. In FIG. 9, the case of changing the block lost of predicted picture into an intraframe coding block is sequentially shown in flow chart.

In the above embodiment, the compressed picture data is decoded and added to another picture data, and the mixed picture data is re-coded by using motion compensation information or the like obtained by decoding the compressed picture data, such that the compressed mixed picture data can be obtained in a simple constitution.

Moreover, the predicted picture lost by mixing is replaced by a new predicted picture obtained by intraframe coding or vector correction, and the picture in the mixing region is predicted by using the motion information of the mixed picture, so as to prevent mismatching with the predicted picture and allow efficient coding while preventing picture deterioration.

In the foregoing embodiments, the picture is mixed on a block by block basis, however the embodiments are not limited in this respect. For example, mixing over plural blocks is also possible. In such a case, to change the motion compensation information, the motion compensation information of decoded picture data or motion information of picture data to be mixed may be selectively used depending on the rate of mixed data contained in the block.

In the above embodiments, similar to the picture coding unit and picture decoding unit, the interframe difference and DCT are combined, however, the embodiments are not limited in this respect. Any other method may be employed as far as the motion compensation and the interframe difference are employed.

FIG. 11 is a block diagram of a compressed picture mixing apparatus in a fifth embodiment of the invention. The fifth embodiment differs from the fourth embodiment in that orthogonal transform coefficients are added as the manner of adding the picture data. That is, instead of directly adding the pixels, the pixels are converted into coefficients by orthogonal transform, and the transform coefficients are added. Since, the picture data to be added are transform coefficients, a transform circuit 42 is provided in the picture information detector 4 as shown in FIG. 11. The transform circuit may be, simply, only a DCT circuit for transforming the pixel data into transform coefficients. Alternatively, using the same coding circuit as in the prior art, the transform coefficients after DCT transform may be issued.

Thus, the same effect as in the fourth embodiment may be obtained in the fifth embodiment.

Figure 12:
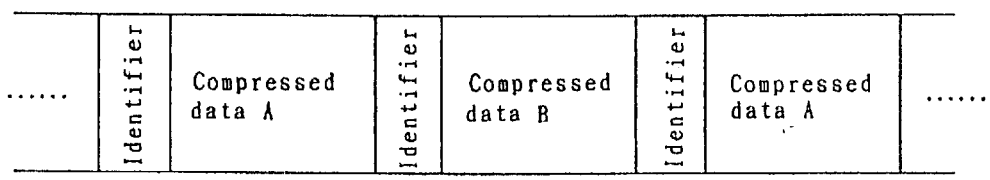
FIG. 12 is an explanatory diagram of a compressed picture mixing method in a sixth embodiment of the invention.
Figure 13:
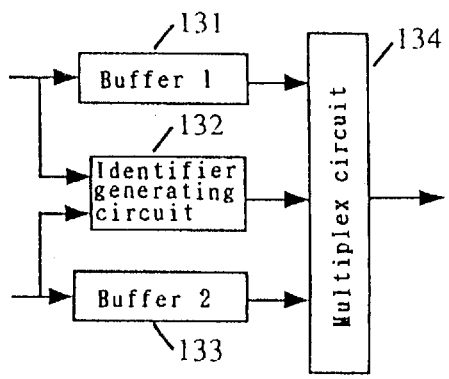
FIG. 13 is a block diagram of a compressed picture mixing apparatus in the sixth embodiment of the invention.

FIG. 12 is an explanatory diagram of a compressed picture mixing method of a sixth embodiment of the invention. In this embodiment, as shown in FIG. 12, compressed picture data A and compressed picture data B, which are to be mixed with the compressed picture data A, are multiplexed through the implementation of different identifiers. FIG. 13 shows an example of a circuit for generating the multiplexed compressed picture data which is shown in FIG. 12. In FIG. 13, the compressed picture data A is stored in a first buffer 131, and the compressed picture data B is stored in a second buffer 133. A multiplexer 134 adds the identifier generated in an identifier generating circuit 132 before each compressed picture data while adjusting the timing, and multiplexes and delivers the data in the sequence as shown in FIG. 12.

FIG. 14 is a block diagram of a picture mixing apparatus for decoding and mixing the multiplexed compressed picture data. The multiplexed compressed picture data are separated depending on the identifier by a de-multiplex circuit 5, and is then fed into different picture decoding units 1. Each picture decoding unit 1 is the same as the picture decoding unit 1 in FIG. 11. The picture data obtained by decoding in the picture decoding units are added by an adder 140 to generate a mixed picture data.

In this way, by multiplexing two or more compressed picture data to be mixed, separating them at the decoding side, and adding the pixel data thereof, a mixed picture is obtained. In this embodiment, plural picture decoding units 1 are necessary, but, for example in the case of simultaneous broadcasting of multiple programs, when it is desired to mix same character information in each, the mixing devices are needed as many as the number of programs at the transmission side in embodiments 4 and 5, but only one is needed at the transmission side in this embodiment. Alternatively, by selecting the identifier at the reception side, it is also possible to select the picture to be mixed.

The sixth embodiment is an example of compressed picture data being compressed by prediction coding, but is not limited to this. For example, it can be also applied to compressed picture data using only intraframe coding.

Moreover in the sixth embodiment which has two picture decoding units, the pictures decoded by the respective picture decoding units are added, however, depending on the method of mixing pictures, it is possible to replace a part of one picture with a part of other picture. In such a case, two picture decoding units are not needed, and by setting the picture decoding in the same picture decoding unit at different times, a mixed picture may be obtained by a single picture decoding unit.

In the foregoing embodiments, nothing is mentioned about the resolution of the pictures being mixed and mixed picture, but these pictures may differ in resolution, and a small picture may be mixed into a part of a larger picture, or only a partial region of a picture may be mixed it is identical in resolution.

What is claimed is:

1. A compressed picture editing apparatus for linking at an editing point first and second compressed picture data each containing prediction-coded frames which have been obtained by dividing picture data in each frame into a plurality of two-dimensional blocks, transforming each of the two-dimensional blocks by selectively using one of a frame-based orthogonal transform and a field-based orthogonal transform, and prediction-coding each transformed two-dimensional block by employing at least one of a forward prediction for predicting a picture data in a frame from a preceding frame, a backward prediction for predicting a picture data in a frame from a succeeding frame and a bidirectional prediction for predicting a picture data in a frame using both the forward prediction and backward prediction, said apparatus comprising:

means for receiving the first and second compressed picture data;

decoding means for decoding a frame of the second compressed picture data at a position corresponding to the editing point to generate a decoded frame and to obtain at least one of motion compensation information of the decoded frame, motion vector information of the decoded frame and orthogonal transform mode information indicating whether each two-dimensional block in the decoded frame has been subjected to the frame-based orthogonal transform or the field-based orthogonal transform;

encoding means for coding the decoded frame by using at least one of the motion compensation information, motion vector information and orthogonal transform mode information to obtain a re-coded frame and to generate a modified second compressed picture data containing the re-coded frame; and means for linking the first compressed picture data and the modified second compressed picture data at the editing point.

2. A compressed picture mixing method for mixing a first picture data and a second picture data, the first picture data being a compressed picture data containing prediction-coded frames which have been obtained by dividing picture data in each frame into a plurality of two-dimensional blocks, transforming each of the two-dimensional blocks by selectively using one of a frame-based orthogonal transform and a field-based orthogonal transform, and prediction-coding each transformed two-dimensional block by employing at least one of a forward prediction for predicting a picture data in a frame from a preceding frame, a backward prediction for predicting a picture data in a frame from a succeeding frame and a bidirectional prediction for predicting a picture data in a frame using both the forward prediction and a backward prediction, said method comprising:

receiving the first and second picture data;

decoding the first picture data to obtain a decoded first picture data and to obtain at least one of motion compensation information of the first picture data, motion vector information of the first picture data and orthogonal transform mode information indicating whether each two-dimensional block in each of the first picture data has been subjected to the frame-based orthogonal transform or the field-based orthogonal transform;

adding the decoded first picture data and the second picture data to obtain a mixed picture data; and coding the mixed picture data by using at least one of the motion compensation information, mode vector information and orthogonal transform mode information.

3. A compressed picture mixed method for mixing a first picture data and a second picture data, the first picture data being a compressed picture data containing prediction-coded frames which have been obtained by dividing picture data in each frame into a plurality of two-dimensional blocks, transforming each of the two-dimensional blocks by selectively using one of a frame-based orthogonal transform and a field-based orthogonal transform, and prediction-coding each transformed two-dimensional block by employing at least one of a forward prediction for predicting a picture data in a frame from a preceding frame, a backward prediction for predicting a picture data in a frame from a succeeding frame and a bidirectional prediction for predicting a picture data in a frame using both the forward prediction and backward prediction, said method comprising:

receiving the first and second picture data;

decoding the first picture data to obtain first orthogonal transform coefficients of the first picture data and to obtain at least one of motion compensation information of the first picture data, motion vector information of the first picture data and orthogonal transform mode information indicating whether each two-dimensional block in each frame of the first picture data has been subjected to the frame-based orthogonal transform or the field-based orthogonal transform;

orthogonal transform coding the second picture data to obtain second orthogonal transform coefficients;

adding the first orthogonal transform coefficients and the second orthogonal transform coefficients to obtain mixed orthogonal transform coefficients; and coding the mixed orthogonal transform coefficients by using at least one of the motion compensation information, motion vector information and orthogonal transform mode information.

4. A compressed picture mixing method for mixing a first picture data and a second picture data, the first picture data being a compressed picture data containing prediction-coded frames which have been obtained by prediction-coding employing at least one of a forward prediction for predicting a picture data in a frame from a preceding frame, a backward prediction for predicting a picture data in a frame from a succeeding frame and a bidirectional prediction for predicting a picture data in a frame using both the forward prediction and backward prediction, said method comprising:

receiving the first and second picture data;

decoding the first picture data to obtain a decoded first picture data;

adding at least a part of the decoded first picture data and the second picture data to obtain a mixed picture data which includes a first part containing only the second picture data, a second part containing only the second picture data, and a third part containing both the decoded first picture data and the second picture data; and coding the mixed picture data, said coding codes the first part by prediction using only a picture data contained in the first picture data, codes the second part by prediction using only a picture data contained in the second picture data, and codes the third part by prediction using motion compensation information derived from one of the first picture data and the second picture data.

5. A compressed picture mixed apparatus for mixing a first picture data and a second picture data, the first picture data being a compressed picture data containing prediction-coded frames which have been obtained by dividing picture data in each frame into a plurality of two-dimensional blocks, transforming each of the two-dimensional blocks by selectively using one of a frame-based orthogonal transform and a field-based orthogonal transform, and prediction-coding each transformed two-dimensional block by employing at least one of a forward prediction for predicting a picture data in a frame from a preceding frame, a backward prediction for predicting a picture data in a frame from a succeeding frame and a bidirectional prediction for predicting a picture data in a frame using both the forward prediction and backward prediction, said apparatus comprising:

means for receiving the first and second picture data;

decoding means for decoding the first picture data to obtain a decoded first picture data and to obtain at least one of motion compensation information of the first picture data, motion vector information of the first picture data and orthogonal transform mode information indicating whether each two-dimensional block in each frame of the first picture data has been subjected to the frame-based orthogonal transform or the field-based orthogonal transform;

adding means for adding the decoded first picture data and the second picture data to obtain a mixed picture data;

encoding means for coding the mixed picture data by using at least one of the motion compensation information, motion vector information and orthogonal transform mode information; and control means receiving the motion compensation information, motion vector information and orthogonal transform mode information for controlling said encoding means.

6. A compressed picture mixed apparatus for mixing a first picture data and a second picture data, the first picture data being a compressed picture data containing prediction-coded frames which have been obtained by dividing picture data in each frame into a plurality of two-dimensional blocks, transforming each of the two-dimensional blocks by selectively using one of a frame-based orthogonal transform and a field-based orthogonal transform and prediction-coding each transformed two-dimensional block by employing at least one of a forward prediction for predicting a picture data in a frame from a preceding frame, a backward prediction for predicting a picture data in a frame from a succeeding frame and a bidirectional prediction for predicting a picture data in a frame using both the forward prediction and backward prediction, said apparatus comprising:

means for receiving the first and second picture data;

decoding means for decoding the first picture data to obtain first orthogonal transform coefficients and to obtain at least one of motion compensation information of the first picture data, motion vector information of the first picture data and orthogonal transform mode information indicating whether each two-dimensional block in each frame of the first picture data has been subjected to the frame-based orthogonal transform or the field-based orthogonal transform;

transform means for orthogonal transforming the second picture data to obtain second orthogonal transform coefficients;

adding means for adding the first orthogonal transform coefficients and the second orthogonal transform coefficients to obtain mixed orthogonal transform coefficients;

encoding means for coding the mixed orthogonal transform coefficients by using at least one of the motion compensation information, motion vector information and orthogonal transform mode information; and control means receiving the motion compensation information, motion vector information and orthogonal transform mode information for controlling said encoding means.

* * * * *